United States Patent Office 2,875,661
Patented Mar. 3, 1959

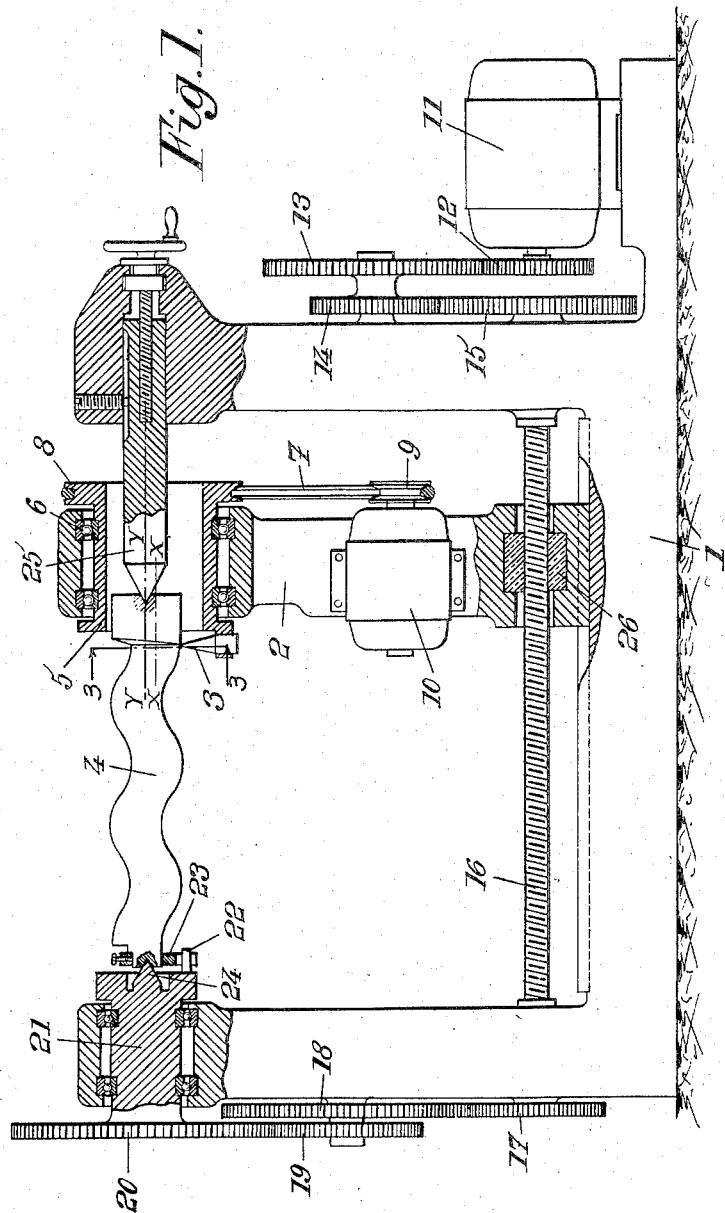

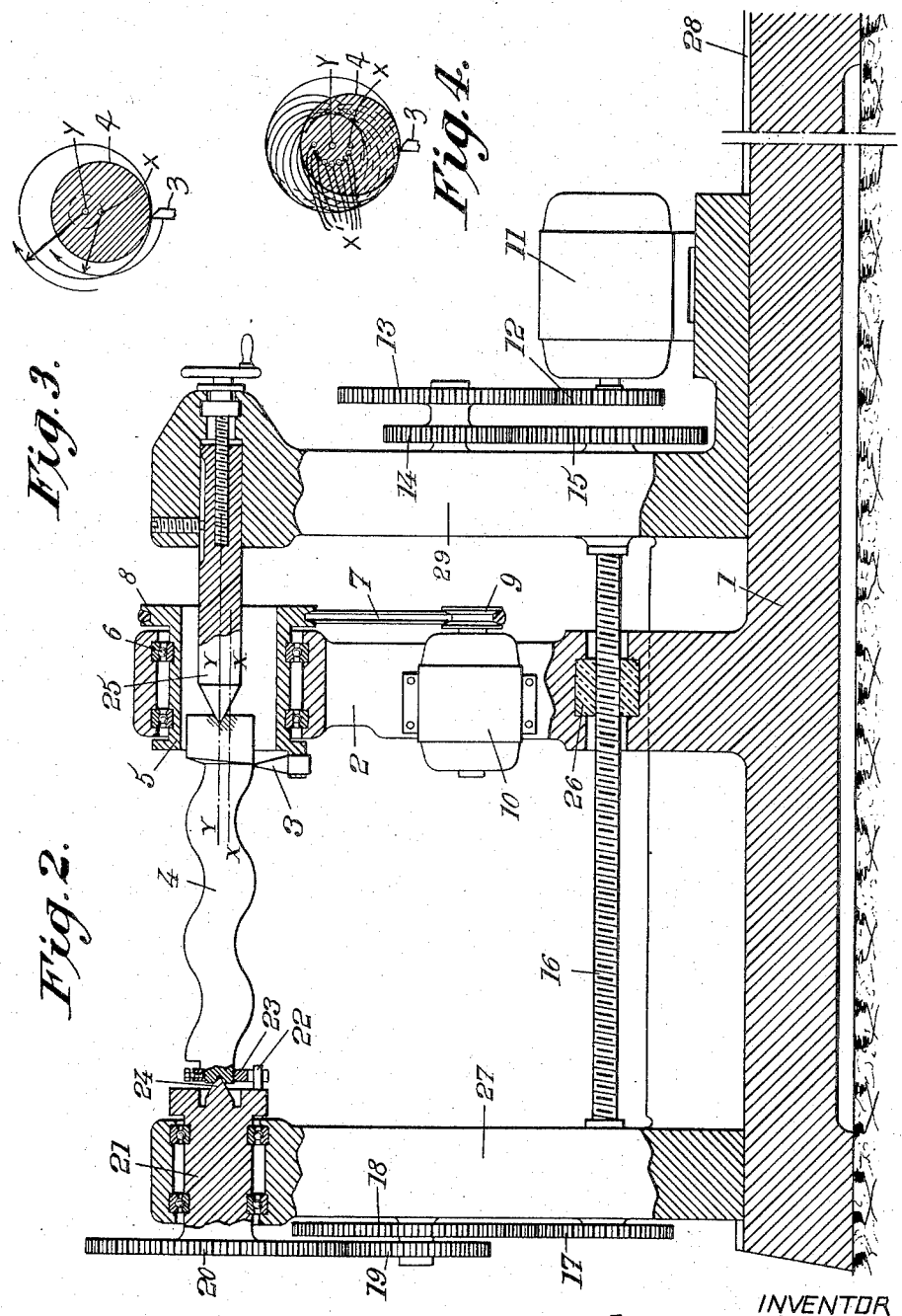

2,875,661

MACHINES FOR MACHINING HELICOID-SHAPED PIECES

Jacques Fougeray du Coudrey, Paris, France, assignor to Societe Generale de Mecanique et de Metallurgie, Paris, France, a French society Application July 28, 1954, Serial No. 446,375

Claims priority, application France August 14, 1953

3 Claims. (Cl. 82—5)

The present invention relates to machines for machining surfaces, in the form of a helicoid having circular cross-sections, that is to say of a surface generated by a circle remaining constantly parallel to a fixed plane and the centre of which moves along a helix the axis of which is at right angles to said plane.

The object of the present invention is to provide a machine of this kind which is better adapted to meet the requirements of practice, especially from the point of view of simplicity, accuracy and rapidity of machining, than those existing at the present time.

My invention consists essentially in providing such a machine with at least one tool having a movement of rotation with respect to a support and with means for imparting to the piece to be machined and to said support, with respect to each other, a relative helicoidal movement the axis of which is parallel to the axis about which the tool is rotated but distant from said axis, whereby the centre of every circular displacement of the tool moves with respect to the piece to be machined along a helical path.

Preferred embodiments of my invention will be hereinafter described with reference to the accompanying drawings given merely by way of example and in which:

Fig. 1 is a longitudinal sectional view of a first embodiment of my invention.

Fig. 2 is a similar view of another embodiment of said invention.

Fig. 3 is a cross-sectional view taken on the line 3—3 of Fig. 1; and

Fig. 4 is a view similar to Fig. 3 showing relationship of elements after the work piece has made one half revolution.

The machine illustrated by the drawings is intended to produce a helicoidal shaft, that is to say a piece the cross sections of which by planes at right angles to its axis are circular, the centres of said circular sections being located on a helix extending about said longitudinal axis.

Such a machine includes a frame 1 carrying a support 2 on which is mounted a cutting tool 3.

Tool 3 is driven with respect to said support 2 in such manner as to have a movement of rotation of suitable speed about an axis X—X.

On the other hand, means are provided for imparting to the piece 4 to be machined, with respect to support 2, a relative helicoidal movement the axis of which, shown at Y—Y, is parallel to X—X but distant therefrom.

Thus, the centre of every circular displacement of the tool will move with respect to piece 4 along a path in the form of a helix traced on a cylinder having its axis on Y—Y and of a radius equal to the distance between axes X—X and Y—Y.

In the construction illustrated by the drawings, tool 3 is carried by a sleeve 5 journalled in support 2 by means of ball bearings 6. This sleeve 5 is rotated by a belt 7 passing around pulleys 8 and 9 respectively carried by sleeve 5 and the shaft of an electric motor 10 carried by support 2. Of course I might use gear wheels instead of a belt transmission.

The relative helicoidal movement of piece 4 and support 2 with respect to each other may be obtained in different ways and in particular according to either of the two constructions illustrated by Figs. 1 and 2 respectively.

In the construction of Fig. 1, piece 4 is given a movement of rotation about axis Y—Y with respect to its support and the support 2 of the tool is given a translatory displacement parallel to said axis Y—Y with respect to the support of piece 4.

In the construction of Fig. 2, piece 4 is given a movement of rotation about axis Y—Y with respect to its support, but it is this support which is given a translatory movement parallel to said axis Y—Y with respect to the support 2 of the tool.

I will now describe these constructions more in detail.

In the machine of Fig. 1, an electric motor 11 fixed on frame 1 drives through gears 12, 13, 14 and 15 a screw 16. This screw 16 in turn drives, through gears 17, 18, 19 and 20, a spindle 21 which imparts a rotary movement to piece 4 through a pin 22 cooperating with a plate 23 fixed on the end of said piece 4. Piece 4 is mounted between two points 24 and 25 one of which 24 is rigid with spindle 21, whereas the other 25 is carried by frame 1 and adjustable axially.

On the other hand, screw 16 is engaged in a screw-threaded block 26 fixed in support 2 which is slidable longitudinally (i. e. in a direction parallel to axes X—X and Y—Y) with respect to frame 1.

The machine of Fig. 2 is of a construction analogous to that of Fig. 1, but in this case support 2 is rigid with frame 1, whereas the parts 27 and 29 which carry respectively spindle 21 and 25 and also motor 11 are slidable with respect to frame 1 owing to the provision of a slideway 28.

In both cases, point 25 extends into the tool carrying sleeve 5.

The gear ratios of the various gear systems interposed between motor 11 and the parts to be driven must be such that piece 4 rotates at a relatively low speed, which is preferable in view of the fact that this piece is not symmetrical about the axis of rotation.

On the other hand, since piece 4 is rotating at a speed which is equal to $$\frac{1}{n}$$

of that of threaded shaft 16, the pitch of the helicoid surface of piece 4 will be equal to $n$ times that of said screw 16.

Advantageously clutch means (not shown on the drawings) are provided to make it possible to disconnect spindle 21 from driving screw 16.

The relative axis positions of the tool and work piece will be clear from a consideration of Figs. 3 and 4. Fig. 3 is a cross-section on the line 3—3 in Fig. 1 with the larger circle representing the original diameter of the work piece and the shaded circle representing the diameter of the cut produced by the tool 3. The tool 3 rotates about the axis X at a high rate of speed while the workpiece 4 rotates at a slow rate about the axis Y and at the same time a relatively slow axial relative movement takes place between the work piece and the tool. In Fig. 4 the situation is shown after the work piece 4 has rotated through 180° and a certain amount of relative axial movement has taken place. It will be seen that a helical form is achieved by the tool 3 and the small circles indicated at X' indicate the movement of previous centers about which the tool 3 has rotated.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A machine for generating a helicoidal feed groove in a cylindrical work piece, comprising in combination, a frame, a slideway on said frame, a unit comprising a head stock and a tail stock for supporting a work piece for rotation about a first axis corresponding to the axis of said cylindrical work piece and parallel to said slideway, a unit comprising a tool support, one of said units being fixed to said frame, and the other of said units being slidably mounted on said slideway, means on said tool support for supporting and rotating a lathe tool about a second axis offset from, and parallel to, said first axis, said offset being such that said tool makes a continuous cut around a periphery of said cylindrical work piece, means for rotating said work piece at slow speed and for sliding said slidably mounted unit along said slideway at slow speed in timed relation, and means for rotating said tool at high speed relative to said sliding movement, said speeds being so correlated that said tool makes a circular cut in a plane substantially normal to said first axis, and slowly progresses said circular cutting along the axis of said work piece, such that the relatively slow rotation of the work piece creates a helicoidal groove therein.

2. A machine for generating a helicoidal feed groove in a cylindrical work piece, comprising in combination, a frame, a head stock and a tail stock mounted on said frame for supporting a work piece for rotation about a first axis corresponding to the axis of said cylindrical work piece, a slideway on said frame parallel to said first axis, a tool support slidable on said slideway, means on said tool support for supporting and rotating a lathe tool about a second axis offset from, and parallel to, said first axis, said offset being such that said tool makes a continuous cut around the periphery of said cylindrical work piece, means for rotating said work piece at slow speed and for sliding said tool support along said slideway at slow speed in timed relation to the rotation of said work piece, and means for rotating said tool at high speed relative to said sliding movement, said speeds being so correlated that said tool makes a circular cut in a plane substantially normal to said first axis, and slowly progresses said circular cutting along the axis of said work piece, such that the relatively slow rotation of the work piece creates a helicoidal groove therein.

3. A machine for generating a helicoidal feed groove in a cylindrical work piece, comprising in combination, a frame, a slideway on said frame, a head stock and a tail stock slidably mounted on said slideway for supporting a work piece for rotation about a first axis corresponding to the axis of said cylindrical work piece and parallel to said slideway, a tool support fixed on said frame, means on said tool support for supporting and rotating a lathe tool about a second axis offset from, and parallel to, said first axis, said offset being such that said tool makes a continuous cut around the periphery of said cylindrical work piece, means for rotating said work piece at slow speed and for sliding said head stock and tail stock concurrently along said slideway at slow speed in timed relation, and means for rotating said tool at high speed relative to said sliding movement, said speeds being so correlated that said tool makes a circular cut in a plane substantially normal to said first axis, and slowly progresses said circular cutting along the axis of said work piece, such that the relatively slow rotation of the work piece creates a helicoidal groove therein.

References Cited in the file of this patent

UNITED STATES PATENTS

| | | |
|---|---|---|
| 736,799 | Tindel | Aug. 18, 1903 |
| 2,039,646 | Hoisington | May 5, 1936 |
| 2,691,921 | Burgsmuller | Oct. 19, 1954 |
| 2,749,808 | Burgsmuller | June 12, 1956 |

FOREIGN PATENTS

| | | |
|---|---|---|
| 507,833 | Great Britain | June 21, 1939 |